US011533543B1

(12) United States Patent
Suh et al.

(10) Patent No.: US 11,533,543 B1
(45) Date of Patent: Dec. 20, 2022

(54) COMMUNITY BOOSTING OF STREAM VISIBILITY

(71) Applicant: Twitch Interactive, Inc., San Francisco, CA (US)

(72) Inventors: Jeanette Suh, San Francisco, CA (US);
Wali Ansary, Pacifica, CA (US);
Mandy Han, San Francisco, CA (US);
Bianca Speichermann, San Francisco, CA (US); Kevin Lawrence Talampas Pamplona, Richmond, CA (US);
Augustus Charles Yuan, Fremont, CA (US); Ashley Sun, Oakland, CA (US);
Austin Nicole Jacobs, Hillsborough, CA (US); Jiachuan He, Santa Clara, CA (US); Andrew K. Wang, San Francisco, CA (US)

(73) Assignee: TWITCH INTERACTIVE, INC., San Francisco, CA (US)

( * ) Notice: Subject to any disclaimer, the term of this patent is extended or adjusted under 35 U.S.C. 154(b) by 0 days.

(21) Appl. No.: 17/205,322

(22) Filed: Mar. 18, 2021

(51) Int. Cl.
*H04N 21/478* (2011.01)
*H04N 21/4784* (2011.01)
*H04L 65/80* (2022.01)
*H04N 21/472* (2011.01)
*H04N 21/266* (2011.01)

(52) U.S. Cl.
CPC ......... *H04N 21/4784* (2013.01); *H04L 65/80* (2013.01); *H04N 21/266* (2013.01); *H04N 21/472* (2013.01)

(58) Field of Classification Search
None
See application file for complete search history.

(56) References Cited

U.S. PATENT DOCUMENTS

| | | | | |
|---|---|---|---|---|
| 5,774,170 | A * | 6/1998 | Hite | G06Q 30/02 |
| | | | | 348/E7.036 |
| 6,463,585 | B1 * | 10/2002 | Hendricks | H04N 21/235 |
| | | | | 725/35 |
| 6,698,020 | B1 * | 2/2004 | Zigmond | H04N 21/812 |
| | | | | 725/34 |
| 9,986,275 | B2 * | 5/2018 | Smith | G06Q 30/0272 |
| 10,291,965 | B2 * | 5/2019 | Gerhards | H04N 21/84 |
| 2002/0056087 | A1 * | 5/2002 | Berezowski | H04H 60/63 |
| | | | | 725/9 |

(Continued)

FOREIGN PATENT DOCUMENTS

WO  WO-2014130594 A1 * 8/2014 ............. G06Q 30/08

*Primary Examiner* — An Son P Huynh

(74) *Attorney, Agent, or Firm* — BakerHostetler

(57) ABSTRACT

It may be determined when at least one boost achievement condition is satisfied for temporarily boosting visibility of a video streaming channel within one or more interfaces of a video streaming service. The boosting of the visibility of the video streaming channel may be initiated based on satisfaction of the at least one boost achievement condition. It may be determined when at least one boost reward condition is satisfied. The boosting of the visibility of the video streaming channel may be terminated based on satisfaction of the at least one boost reward condition. The at least one boost achievement condition and the at least one boost reward condition may differ for different video streaming channels and may be determined based at least in part on viewership of the different video streaming channels.

16 Claims, 12 Drawing Sheets

(56) References Cited

U.S. PATENT DOCUMENTS

| | | | |
|---|---|---|---|
| 2002/0104083 A1* | 8/2002 | Hendricks | H04N 21/2381 725/34 |
| 2007/0136753 A1* | 6/2007 | Bovenschulte | H04N 21/422 725/46 |
| 2008/0134229 A1* | 6/2008 | Conant | H04N 21/44213 725/23 |
| 2009/0006191 A1* | 1/2009 | Arankalle | G06Q 30/0251 705/14.71 |
| 2010/0223119 A1* | 9/2010 | Klish | G06Q 10/00 705/14.26 |
| 2010/0318405 A1* | 12/2010 | Kirkby | G06Q 30/0283 705/14.69 |
| 2012/0137316 A1* | 5/2012 | Elizarov | H04N 21/24 725/9 |
| 2012/0257112 A1* | 10/2012 | Fritsch | H04N 21/2543 348/580 |
| 2013/0031582 A1* | 1/2013 | Tinsman | H04N 21/4316 725/36 |
| 2013/0304582 A1* | 11/2013 | Beazley | G06Q 30/0251 705/14.64 |
| 2015/0074716 A1* | 3/2015 | Redmann | H04N 21/4223 725/34 |
| 2015/0281635 A1* | 10/2015 | Tang | H04N 5/76 386/295 |
| 2015/0312607 A1* | 10/2015 | Walker | H04N 21/252 725/35 |
| 2015/0332317 A1* | 11/2015 | Cui | G06Q 30/0275 705/14.46 |
| 2017/0006322 A1* | 1/2017 | Dury | A63F 13/49 |
| 2017/0264965 A1* | 9/2017 | Gerhards | H04N 21/64322 |
| 2019/0191203 A1* | 6/2019 | Asbun | H04N 21/2668 |
| 2019/0261061 A1* | 8/2019 | Liassides | H04N 21/812 |

* cited by examiner

910 Determine that at least one first boost achievement condition is satisfied for temporarily boosting a first visibility of a first video streaming channel within one or more interfaces of a video streaming service

912 Initiate, based on satisfaction of the at least one first boost achievement condition, the boosting of the first visibility of the first video streaming channel

914 Determine that at least one first boost reward condition is satisfied

916 Terminate, based on satisfaction of the at least one first boost reward condition, the boosting of the first visibility of the first video streaming channel

918 Determine that at least one second boost achievement condition is satisfied for temporarily boosting a second visibility of a second video streaming channel within the one or more interfaces of the video streaming service, wherein the at least one second boost achievement condition is different from the at least one first boost achievement condition

920 Initiate, based on satisfaction of the at least one second boost achievement condition, the boosting of the second visibility of the second video streaming channel

922 Determine that at least one second boost reward condition is satisfied, wherein the at least one second boost reward condition is different from the at least one first boost reward condition

924 Terminate, based on satisfaction of the at least one second boost reward condition, the boosting of the second visibility of the second video streaming channel

FIG. 9

COMMUNITY BOOSTING OF STREAM VISIBILITY

BACKGROUND

A video streaming service may provide access to large quantities of video streaming channels. The video streaming channels may include video content that is provided to the video streaming service by creators. In one specific example, the creators may be video game players, and the video streaming channels may include video of the creators playing different video games. The video may optionally include game video as well as camera (e.g., webcam) video of the creators as they play the games. Corresponding game audio, as well as microphone audio of the creator speaking during gameplay, may also be provided along with the video. The video streaming channels may, in turn, be streamed by the video streaming service to any number of viewers. Viewers of a given streaming channel may often feel a strong community-type bond both with themselves and with the creator of the content. As a result, viewers may often wish to support and publicize the creator. However, video streaming services may sometimes offer only limited opportunities for viewers to support and publicize creators.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 9 is a flowchart illustrating an example stream visibility boosting process that may be used in accordance with the present disclosure.

DETAILED DESCRIPTION

Figure 1:
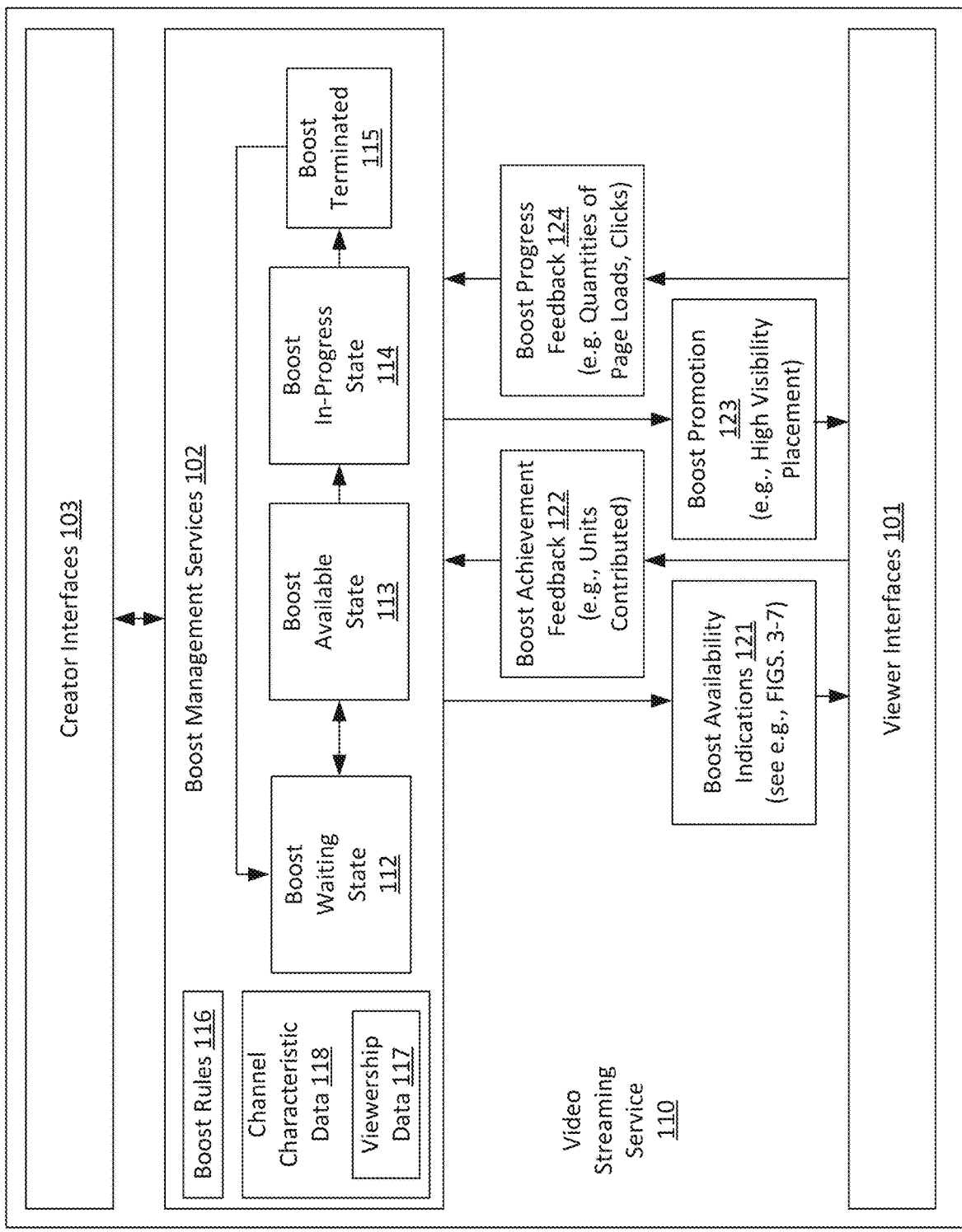
FIG. 1 is a diagram illustrating an example stream visibility boosting system that may be used in accordance with the present disclosure.

Techniques for community boosting of stream visibility are described herein. A video streaming service may provide access to large quantities of video streaming channels. The video streaming channels may include video content that is provided to the video streaming service by creators. In one specific example, the creators may be video game players, and the video streaming channels may include video of the creators playing different video games. The video may optionally include game video as well as camera (e.g., webcam) video of the creators as they play the games. Corresponding game audio, as well as microphone audio of the creator speaking during gameplay, may also be provided along with the video. The video streaming channels may, in turn, be streamed by the video streaming service to any number of viewers.

As described herein, in some examples, the video streaming service may provide features that allow viewers of a streaming channel to cause visibility of the streaming channel to be temporarily boosted. In some examples, the visibility of the streaming channel may be boosted by posting a link, such as in the form of a selectable thumbnail image, to the streaming channel on a high visibility interface of the video streaming service, such as a homepage of the video streaming service. Additionally or alternatively, in some examples, the visibility may be boosted by posting the link at a high visibility area of the homepage, such as a top-left area of the homepage that is often seen first by viewers of the homepage.

In some examples, the boost may be achieved based on satisfaction of boost achievement conditions, which are conditions that are required to be satisfied in order to achieve a boost. The boost achievement conditions may include, for example, receiving of a selected amount of achievement units from one or more viewers. In some examples, the achievement units may include points, credits, monetary units, and the like. In some examples, the boost achievement conditions may be satisfied by successfully completing a boost challenge. The boost challenge may require a selected amount of achievement units to be received from viewers within a designated time period. For example, a boost challenge may be assigned a designated start time and may have a designated time duration. If the selected amount of achievement units are received within the designated time duration after the start time, then the challenge may be completed successfully, and a boost may be awarded to the respective channel. By contrast, if the selected amount of achievement units are not received within the designated time duration after the start time, the challenge may be unsuccessful, and a boost may not be awarded to the respective channel. In some examples, the boost challenge may create a fun and engaging experience that further builds a sense of community among viewers and creators.

As described above, a boosting of a given channel may only be temporary. In some examples, a boosting of a channel may be terminated upon satisfaction of one or more boost reward conditions, which are conditions whose satisfaction results in termination of a boost. In some cases, satisfaction of the boost reward conditions may be based on various factors, such as quantities of homepage loads, quantities of accesses (e.g., clicks) into a channel, and the like. For example, in some cases, a link to a given video channel may be posted on the service homepage for a selected quantity of homepage loads by viewers of the homepage. The service may monitor viewer interactions with the homepage to detect how many times the homepage is loaded with the channel link included in the homepage. Once the selected quantity of homepage loads has occurred, the boost may be terminated, such as by removing the channel's link from the homepage. As another example, in some cases, a link to a given video channel may be posted on the service homepage for a selected quantity of accesses (e.g., clicks) into the channel. The service may monitor viewer interactions with the homepage to determine how many times viewers click on (or otherwise select) the channel link in order to access the channel. Once the selected quantity of accesses (e.g., clicks) has occurred, the boost may be terminated, such as by removing the channel's link from the homepage. In yet other examples, in additional or as an alternative to displaying a link to a channel page, the boost reward condition may include providing other promotional content associated with a video streaming channel on a homepage or other high-visibility interface. For example, the other promotional content may include auto-play content that promotes the boosted streaming channel, such as pre-recorded game video or any other type of promotional content.

In some examples, the boost achievement conditions that are required to achieve a boost may differ for different channels. In some cases, the boost achievement conditions may differ based on various factors, such as the viewership of the different channels. For example, in some cases, the quantities of achievement units that are required to achieve boosts for different channels may vary based on the quantities of viewers of the channels. Specifically, in some examples, a larger quantity of achievement units may be required in order to achieve a boost for a channel with a larger quantity of viewers. By contrast, a smaller quantity of achievement units may be required in order to achieve a boost for a channel with a smaller quantity of viewers. This may help to ensure that boosts are not limited to only larger channels, and this may help ensure that smaller channels with smaller quantities of viewers are provided with sufficient opportunities to get promoted and grow their fan bases. Additionally, in some examples, to further assist promotion of smaller channels, boost opportunities could be limited to only channels that have below a threshold quantity of viewers. Moreover, in some examples, boosts may be limited such that they are only made available to certain channels at certain times (e.g., every eight days), and the quantity of boosts available for a given channel during a given time period may also be limited. This may further help to ensure that boosts are not limited only to larger channels and that smaller channels with smaller viewers quantities are granted ample opportunities to achieve boosts.

In some cases, the sizes of boosts may also differ based on various factors. For example, one boost could offer a reward of being boosted on the service homepage for 100 page loads, while another boost could offer a smaller reward of only 50 page loads. As another example, one boost could offer a reward of being boosted on the service homepage for 100 clicks into the channel, while another boost could offer a smaller reward of only 50 clicks into the channel. In some examples, larger boost rewards (e.g., larger quantities of homepage loads or channel clicks) may be made available only to channels with larger viewership. By contrast, in some examples, smaller boost rewards (e.g., smaller quantities of homepage loads or channel clicks) may be made available only to channels with smaller viewership. This may prevent smaller channels from being overwhelmed with a sudden influx of new viewers. Moreover, in some examples, the size of a reward may be based on a quantity of achievement units that are required in order to obtain the reward. For example, a larger quantity of achievement units may be required to obtain a boost having a larger quantity of homepage loads or channel clicks. By contrast, a smaller quantity of achievement units may be required to obtain a boost having a smaller quantity of homepage loads or channel clicks. Thus, by making boosts with smaller size rewards (and, therefore, smaller achievement requirements) available to channels with smaller viewership, the service may allow these smaller channels to more easily obtain the boosts and also ensure that the smaller channels have sufficient opportunity for promotion.

In some examples, indications may be displayed in viewer interfaces, such as a channel page, to inform viewers when a boost challenge starts and/or when other types of boosts become available for a streaming channel. Moreover, in some examples, the viewer interfaces may display additional information, such as the reward for the boost (e.g., quantity of homepage loads, quantity of clicks into the channel, etc.), the achievement conditions (e.g., quantity of achievement units required to achieve the boost, etc.), and the like. Furthermore, for boost challenges, additional information may be displayed, such as the amount and/or percentage of achievement units that have already been raised during the boost challenge, the time remaining in the boost challenge, and the like.

FIG. 1 is a diagram illustrating an example stream visibility boosting system that may be used in accordance with the present disclosure. As shown in FIG. 1, a video streaming service 110 operates boost management services 102. The video streaming service 110 receives video content from creators and, in turn, provides the video content to viewers via a plurality of video streaming channels. In one specific example, the creators may be video game players, and the video streaming channels may include video of the creators playing different video games. The video may optionally include game video as well as camera (e.g., webcam) video of the creators as they play the games. Corresponding game audio, as well as microphone audio of the creator speaking during gameplay, may also be provided along with the video. The video may be transmitted from the creators to the video streaming service 110, and in turn from video streaming service 110 to viewers, over one or more networks, for example one or more local area networks (LAN's) and/or one or more wide area networks (WAN's), such as the Internet. Additionally, the video may be transmitted using streaming transmission techniques, in which portions of transmitted content are received and played while subsequent portions of the transmitted content are being transmitted. In some examples, the video streaming service may receive and transmit video content using live streaming techniques. The term live streaming, as used herein, refers to scenarios in which video content of an event (e.g., a video game) may be transmitted to viewers, and at least part of the video content may be played while the event is still occurring (e.g., while the video game is still being played by the players), albeit with some small amounts latency between the time that video content is captured and the time that the video content is eventually played to viewers.

The boost management services 102 may generally manage community boosting of video streams provided by video streaming service 110. In the example of FIG. 1, the community boosting of streams may be performed in accordance with boost rules 116. Boost rules 116 may generally define which streaming channels of the video streaming service 110 are eligible to receive boosts. For example, in some cases, only channels that are in good standing with video streaming service 110 may be eligible to receive boosts, such as channels that have not breached terms of service, channels that have refrained from transmitting offensive or indecent content, and the like. Additionally, in some examples, eligible channels may also be limited to channels with less than and/or more than threshold viewership sizes.

The boost rules 116 may also define certain tiers of channels, such as based on the viewership sizes (e.g., average viewership, total viewership, etc.) of the channels. In one specific example, all channels with viewership above an upper threshold quantity could be grouped into a high viewership tier, all channels with viewership between the upper threshold quantity and a lower threshold quantity could be placed into a medium viewership tier, and all channels with viewership below the lower threshold quantity could be placed into a low viewership tier. It is noted, however, that any number of tiers may be created based on any selected criteria. For example, in some cases, other factors, such as the age of a channel, a genre of a channel, and the like, may be considered when classifying and/or grouping channels. The term viewership, as used herein, refers to characteristics of viewers, such as a quantity of viewers and/or other attributes of features of the viewers. In the example of FIG. 1, the video streaming service 110 may collect and update channel characteristic data 118. The channel characteristic data 118 may include data regarding characteristics of channels that may be used to determine characteristics of boosts that are made available to the channels. For example, channel characteristic data 118 may include viewership data 117, which may indicate viewership amounts for each video channel provided by the video streaming service 110. The viewership data 117 may be used to group the video channels into different viewership tiers. The channel characteristic data 118 may also include data regarding other characteristics that may be used to group channels, such as channel age, channel genre, channel settings, characteristics of a creator that operates the channel, characteristics of games or other content provided via the channel, characteristics of channel advertisers, and other characteristics.

The boost rules 116 may indicate how frequently boosts are made available (e.g., every week, every two weeks, etc.). The availability frequency may vary for different types of boosts (e.g., boost challenge, other types of boosts) and may also very for channels with different viewership sizes (e.g., channels in different tiers) or other channel characteristics. Additionally, in some examples, the boost rules 116 may indicate which boosts are made available to which tiers of channels and the respective characteristics (e.g., required achievement conditions, reward conditions, etc.) of the boosts. For example, the boost achievement conditions that are required to achieve a boost may differ for different channels. In some cases, the boost achievement conditions may differ based on various factors, such as the viewership and/or other channel characteristics of the different channels. For example, in some cases, the quantities of achievement units that are required to achieve boosts for different channels may vary based on the quantities of viewers of the channels. Specifically, in some examples, a larger quantity of achievement units may be required in order to achieve a boost for a channel with a larger quantity of viewers. By contrast, a smaller quantity of achievement units may be required in order to achieve a boost for a channel with a smaller quantity of viewers. This may help to ensure that boosts are not limited to only larger channels, and this may help ensure that smaller channels with smaller quantities of viewers are provided with sufficient opportunities to get promoted and grow their fan bases.

The boost rules 116 may also indicate the reward conditions of boosts, which may differ based on various factors. For example, one boost could offer a reward of being boosted on the service homepage for 100 page loads, while another boost could offer a smaller reward of only 50 page loads. As another example, one boost could offer a reward of being boosted on the service homepage for 100 clicks into the channel, while another boost could offer a smaller reward of only 50 clicks into the channel. In some examples, larger boost rewards (e.g., larger quantities of homepage loads or channel clicks) may be made available only to channels with larger viewership. By contrast, in some examples, smaller boost rewards (e.g., smaller quantities of homepage loads or channel clicks) may be made available only to channels with smaller viewership. This may prevent smaller channels from being overwhelmed with a sudden influx of new viewers. Moreover, in some examples, the size of a reward may be based on a quantity of achievement units that are required in order to obtain the reward. For example, a larger quantity of achievement units may be required to obtain a boost having a larger quantity of homepage loads or channel clicks. By contrast, a smaller quantity of achievement units may be required to obtain a boost having a smaller quantity of homepage loads or channel clicks.

Figure 2:
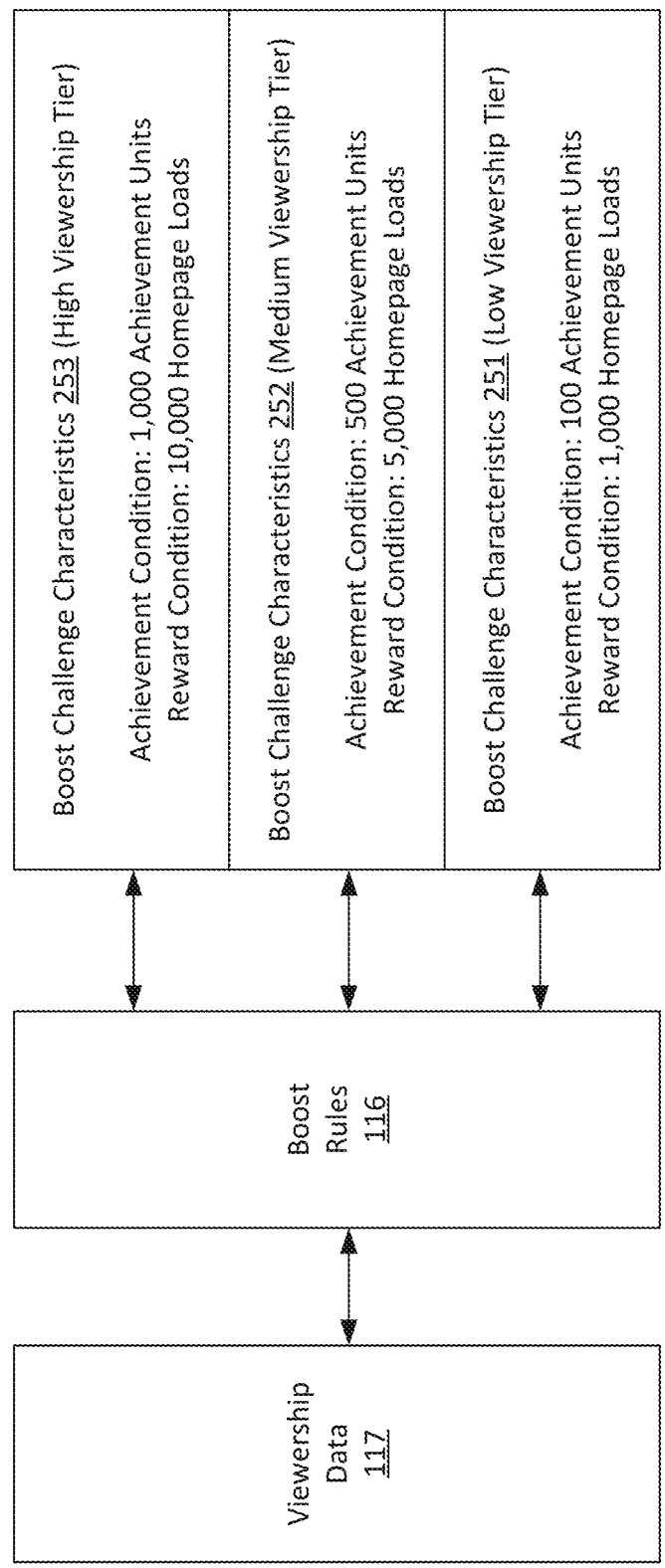
FIG. 2 is a diagram illustrating example boost challenge characteristics for different viewership tiers that may be used in accordance with the present disclosure.

Referring now to FIG. 2, a specific example is shown of how boost characteristics may differ for channels with different viewership. As shown in FIG. 2, boost rules 116 may include boost challenge characteristics 251, which are for the low viewership tier described above, boost challenge characteristics 252, which are for the medium viewership tier described above, and boost challenge characteristics 253, which are for the high viewership tier described above. In this example, boost challenge characteristics 251 indicate that, for the channels in the low viewership tier (e.g., having viewership below a lower threshold viewership quantity), the achievement condition is 100 achievement units, meaning that a boost challenge may be successfully completed (and a boost may be achieved) when 100 achievement units are contributed. Additionally, the reward condition for the low viewership tier is 1,000 homepage loads, meaning that a link to the channel may be posted on the service homepage until the homepage, including the posted link, is loaded 1,000 times. Additionally, boost challenge characteristics 252 indicate that, for the channels in the medium viewership tier (e.g., having viewership between upper and lower threshold viewership quantities), the achievement condition is 500 achievement units, meaning that a boost challenge may be successfully completed (and a boost may be achieved) when 500 achievement units are contributed. Additionally, the reward condition for the medium viewership tier is 5,000 homepage loads, meaning that a link to the channel may be posted on the service homepage until the homepage, including the posted link, is loaded 5,000 times. Furthermore, boost challenge characteristics 253 indicate that, for the channels in the high viewership tier (e.g., having viewership above an upper threshold viewership quantity), the achievement condition is 1,000 achievement units, meaning that a boost challenge may be successfully completed (and a boost may be achieved) when 1,000 achievement units are contributed. Additionally, the reward condition for the high viewership tier is 10,000 homepage loads, meaning that a link to the channel may be posted on the service homepage until the homepage, including the posted link, is loaded 10,000 times. It is noted that all tiers and characteristics shown in FIG. 2 are merely non-limiting examples and that any number of tiers with any types of respective characteristics may be employed.

As described above, in some examples, a boost may be achieved based on satisfaction of boost achievement conditions. The boost achievement conditions may include, for example, receiving of a selected amount of achievement units from one or more viewers. In some examples, the achievement units may include points, credits, monetary units, and the like. For example, in some cases, the video streaming service may award points to viewers for performing actions related to a channel, such as viewing the channel for selected amounts of time, following the channel, participating in raids, and the like. These awarded points may then be used as achievement units, such as by being contributed, by the viewers, in order to obtain boosts. It is noted, however, that achievement units are not limited to points awarded by the video streaming service and may also include other types of units, such as the viewer's own money, credits, or other types of units.

Referring back to FIG. 1, it is seen that boost management services 102 may communicate with creator interfaces 103. For example, in some cases, creator interfaces 103 may allow creators to set various options regarding boosts. In some examples, creator interfaces 103 may allow creators to, temporarily or permanently, opt-in and/or opt-out of having boosts be made available for their respective channels. Creator interfaces 103 may also optionally allow creators to delay the start time of boosts, such as to delay a boost to a time that is more convenient for the creator. In some examples, the video streaming service 110 may allow creators to control how frequently boosts are made available, and the creator interfaces 103 may allow creators to control these and other parameters. Moreover, in some examples, creator interfaces 103 may provide a status of in-progress boost challenges (e.g., goal unit quantity, current raised unit quantity, time remaining, etc.) as well as a reward status of in-progress boosts, such as by providing indications of current amounts of homepage loads and/or channel accesses that have occurred during an in-progress boost, and indications of the total quantity of homepage loads and/or channel accesses that the boost may provide before being terminated.

As also shown in FIG. 1, boost management services 102 may assist in transferring a channel's boost status between different states. In the example of FIG. 1, these states include boost waiting state 112, boost available state 113, and boost in-progress state 114. When a channel is in boost waiting state 112, there is no boost that is currently available for the channel. As described above, the video streaming service 110 may make boosts available to a channel at certain intervals, such as every week or every two weeks. This may help to ensure that smaller channels have sufficient opportunities to obtain boosts and may also help to preserve space/availability on high visibility interfaces of the video streaming service 110. When a boost becomes available for a channel, the channel may be transferred from boost waiting state 112 to boost available state 113. For example, a channel may be in boost available state 113 during the time that a boost challenge is occurring and/or during times that other boosts are made available to viewers of the video streaming service 110. In some examples, if a boost is not achieved during the available times, then the channel may be transferred from the boost available state 113 back to the boost waiting state 112. This may occur, for example, when a boost challenge is unsuccessful or when no available boosts are otherwise obtained within a selected time period of boost availability. By contrast, if a boost is achieved while the channel is in the boost available state 113, then the channel may be transferred to boost in-progress state 114. While in boost in-progress state 114, the channel may be promoted on high visibility interfaces of the video streaming service 110, such as the service homepage. The channel may remain in boost in-progress state 114 until the boost reward conditions are satisfied, such as for a selected quantity of homepage loads or accesses of the channel from the homepage. Once the boost reward conditions are satisfied, a boost termination 115 may occur, and the channel may be returned to the boost waiting state 112.

In some examples, when a channel is in the boost available state 113, the boost management services 102 may provide boost availability indications 121 of available boosts to the viewers via viewer interfaces 101, such as channel pages. A channel page is a page that displays video from a channel (e.g., via a video player included on the channel page) as well as optionally other information, interactive options, chat, and other features associated with the channel. In some examples, the boost availability indications 121 may inform viewers when a boost challenge starts and/or when other types of boosts become available for a streaming channel. Moreover, in some examples, the boost availability indications 121 may include information, such as the reward for the boost (e.g., quantity of homepage loads, quantity of clicks into the channel, etc.), the achievement conditions (e.g., quantity of achievement units required to achieve the boost, etc.), and the like. Furthermore, for boost challenges, the boost availability indications 121 may include the amount and/or percentage of achievement units that have already been raised during the boost challenge, the time remaining in the boost challenge, and the like.

Additionally, boost achievement feedback 122 may be provided from viewer interfaces (e.g., channel pages) back to boost management services 102. The boost achievement feedback 122 may include feedback associated with achievement of a boost, such as quantities of boost contributions (e.g., quantities and types of achievement units contributed), the type of boost for which the contributions were made, the date and time that the contributions were made, identification information for viewers or other individuals or entities that made the contributions, and the like.

Figure 3:
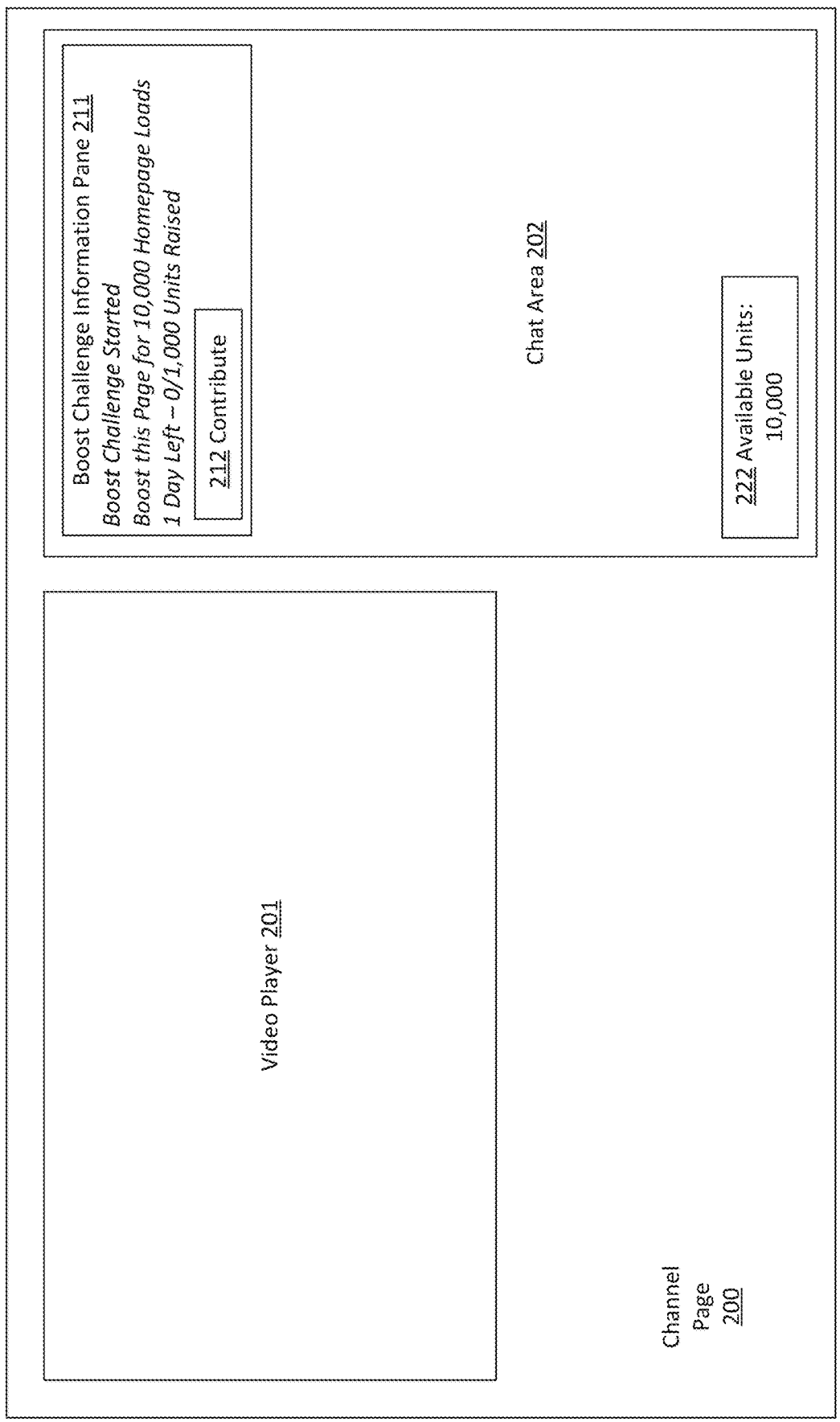
FIG. 3 is a diagram illustrating an example boost challenge information pane that may be used in accordance with the present disclosure.

Some examples of boost availability indications 121 will now be described in detail. Specifically, FIGS. 3-7 include examples of various user interfaces that may be employed to provide information regarding available boosts. Referring now to FIG. 3, an example is shown of a boost challenge information pane 211 that may be employed to provide information about an in-progress boost challenge. In the example of FIG. 3, a channel page 200 is displayed for a given video streaming channel of video streaming service 110. The channel page 200 includes a video player 201, which plays and displays video that is transmitted via the respective video streaming channel. The channel page 200 also includes a chat area 202, which allows viewers of the streaming channel to post and view chat messages associated with the video streaming channel. In the example of FIG. 3, the boost challenge information pane 211 is displayed in the chat area 202. In this example, the boost challenge information pane 211 includes text to indicate that the boost challenge has started. The boost challenge information pane 211 also indicates the reward condition for the boost challenge, which in this example is posting of a link to the channel page on the service homepage for 10,000 homepage loads. The boost challenge information pane 211 also indicates the time remaining in the boost challenge, which in this example is 1 day. The boost challenge information pane 211 also indicates the required contributions to achieve the boost (which in this example is 1,000 achievement units) and the current contributions towards the boost from all viewers (which in this example is currently 0 achievement units). In some examples, the boost challenge information pane 211 may be displayed only temporarily.

Additionally, in some examples, the boost challenge information pane 211 may be displayed at various selected time intervals during the boost challenge, such as once per hour, once per day, etc. The time interval may change, such as to be display the boost challenge information pane 211 more frequently as the boost challenge nears completion of its allowed time duration. Furthermore, in some examples, the boost challenge information pane 211 may be displayed at various other intervals during the boost challenge, such as when selected amounts of achievement points are contributed, when a selected percentage of the total required amounts of achievement points are contributed, and the like. Each time that the boost challenge information pane 211 is displayed, the information included therein may be updated to reflect current status conditions. The boost challenge information pane 211 also includes a contribute button 212, which a viewer may select in order to launch a separate pane for contributing to the boost challenge. In this example, the channel page 200 includes an indicator 222, which shows the amount of available achievement units that the viewer of the channel page has accumulated, which in this example is 10,000 units.

Figure 4A:
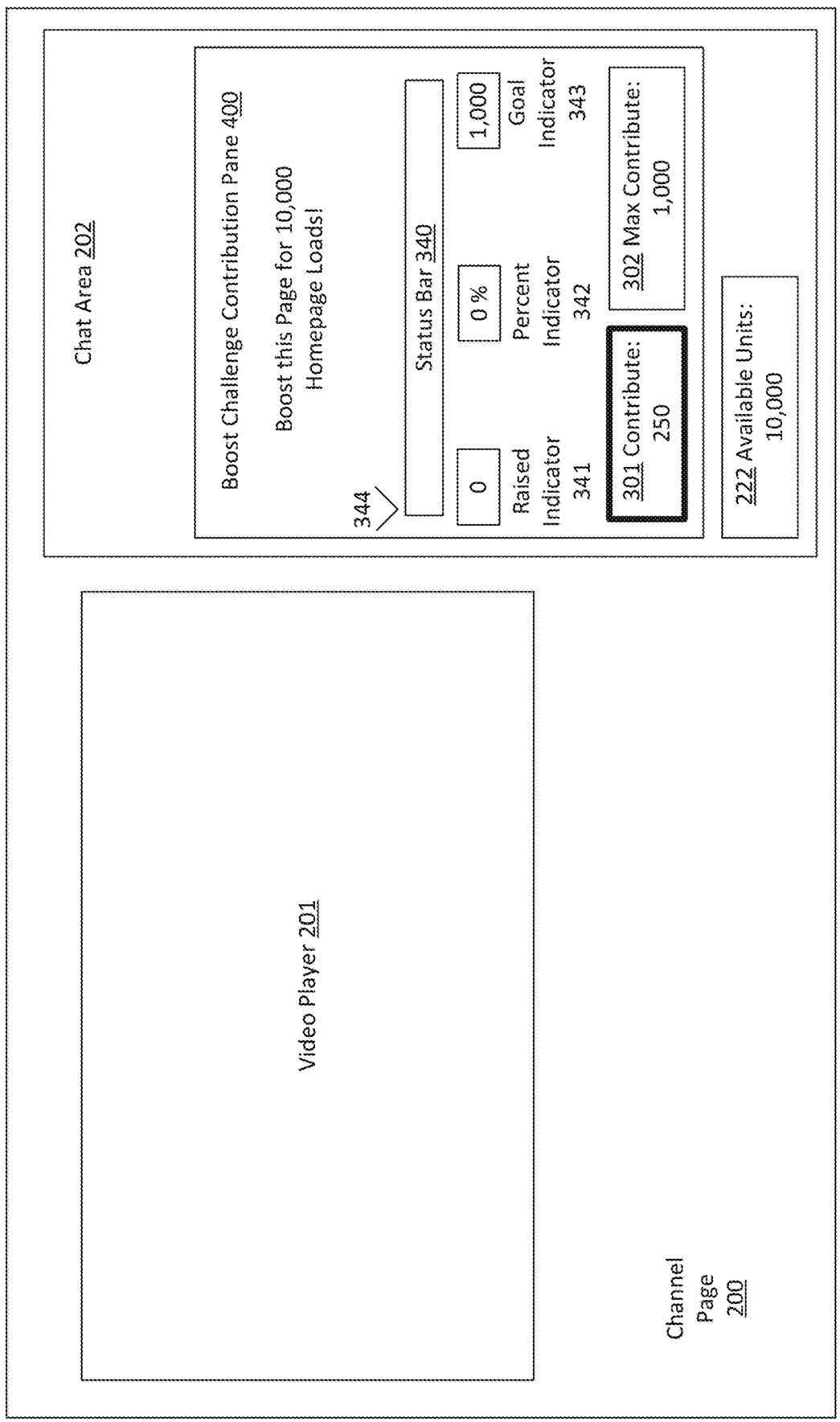
FIGS. 4A-4B are diagrams illustrating example boost challenge contribution panes that may be used in accordance with the present disclosure.

Referring now to FIG. 4A, an example of a boost challenge contribution pane 400 will now be described in detail. In some examples, selection of contribute button 212 of FIG. 3 may cause the boost challenge contribution pane 400 to be displayed. As shown in FIG. 4A, boost challenge contribution pane 400 includes raised indicator 341, which indicates the quantity of achievement units that have been currently contributed (0 units). Boost challenge contribution pane 400 also includes goal indicator 343, which indicates a goal quantity of achievement units that are required to successfully complete the challenge (1,000 units). Boost challenge contribution pane 400 also includes percent indicator 342, which indicates a percentage of the required goal of achievement units that have been currently contributed (0 percent). Boost challenge contribution pane 400 also includes a status bar 340 and slider 344 that visually indicate the progress of the boost challenge. Specifically, the slider 344 moves horizontally from left to right across the status bar 340 to indicate the percentage of the required achievement units that have been contributed. In this example, the slider 344 is all the way to the left edge of status bar 340 to indicate that 0 percent of the required achievement units have been contributed. Boost challenge contribution pane 400 also includes a maximum (max) contribute button 302, which allows the viewer to contribute the remaining required amount of achievement units to complete the boost challenge, which in this case is 1,000 units. In some examples, if the viewer is unable to contribute the remaining required amount of achievement units to complete the boost challenge, then the max contribute button 302 may not be displayed. The boost challenge contribution pane 400 also includes a contribute button 301, which allows the viewer to contribute a less-than-maximum amount of achievement units to the boost challenge, which in this example is 250 units.

Figure 4B:
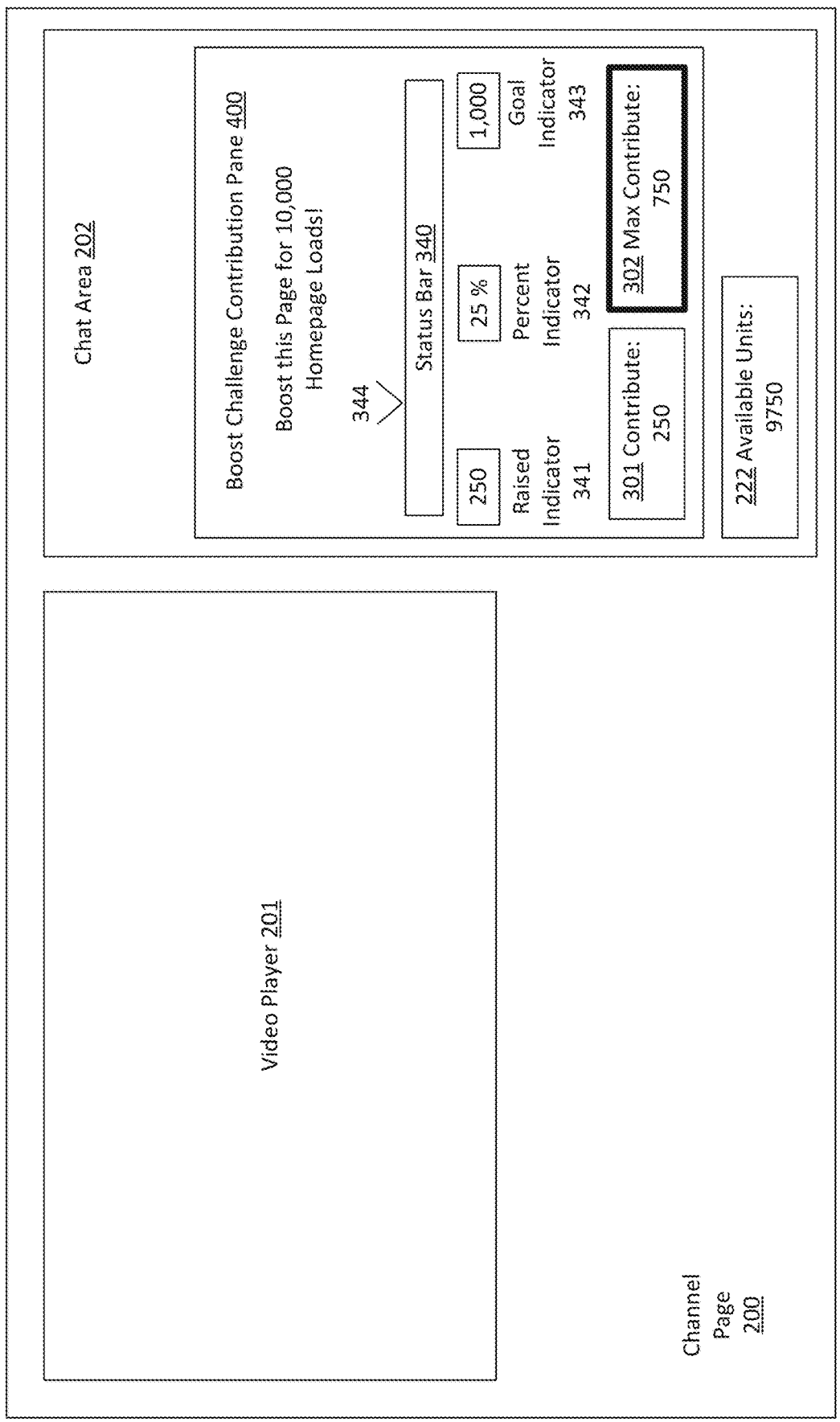

In the example of FIG. 4A, the viewer selects contribute button 301 (as indicated by the thick bold line surrounding contribute button 301) to contribute 250 achievement units to the boost challenge. Referring now to FIG. 4B, an example is shown of boost challenge contribution pane 400 after the viewer contributes 250 achievement units to the boost challenge. As shown in FIG. 4B, after contribution of the 250 achievement units, the raised indicator 341 is increased to show that 250 achievement units have now been contributed to the boost challenge. Additionally, percent indicator 342 is increased to show that 25 percent of the required total achievement units have now been contributed to the boost challenge. Furthermore, slider 344 is moved rightwards from the left edge of status bar 340 to show that 25 percent of the required total achievement units have now been contributed to the boost challenge. Also, max contribute button 302 is modified to show the new maximum contribution, which is now 750 units. Moreover, indicator 222 has changed its displayed value from 10,000 to 9750 to indicate that the viewer now has 9750 achievement units remaining (after contributing 250 units from the previous value of 10,000 units).

Figure 5:
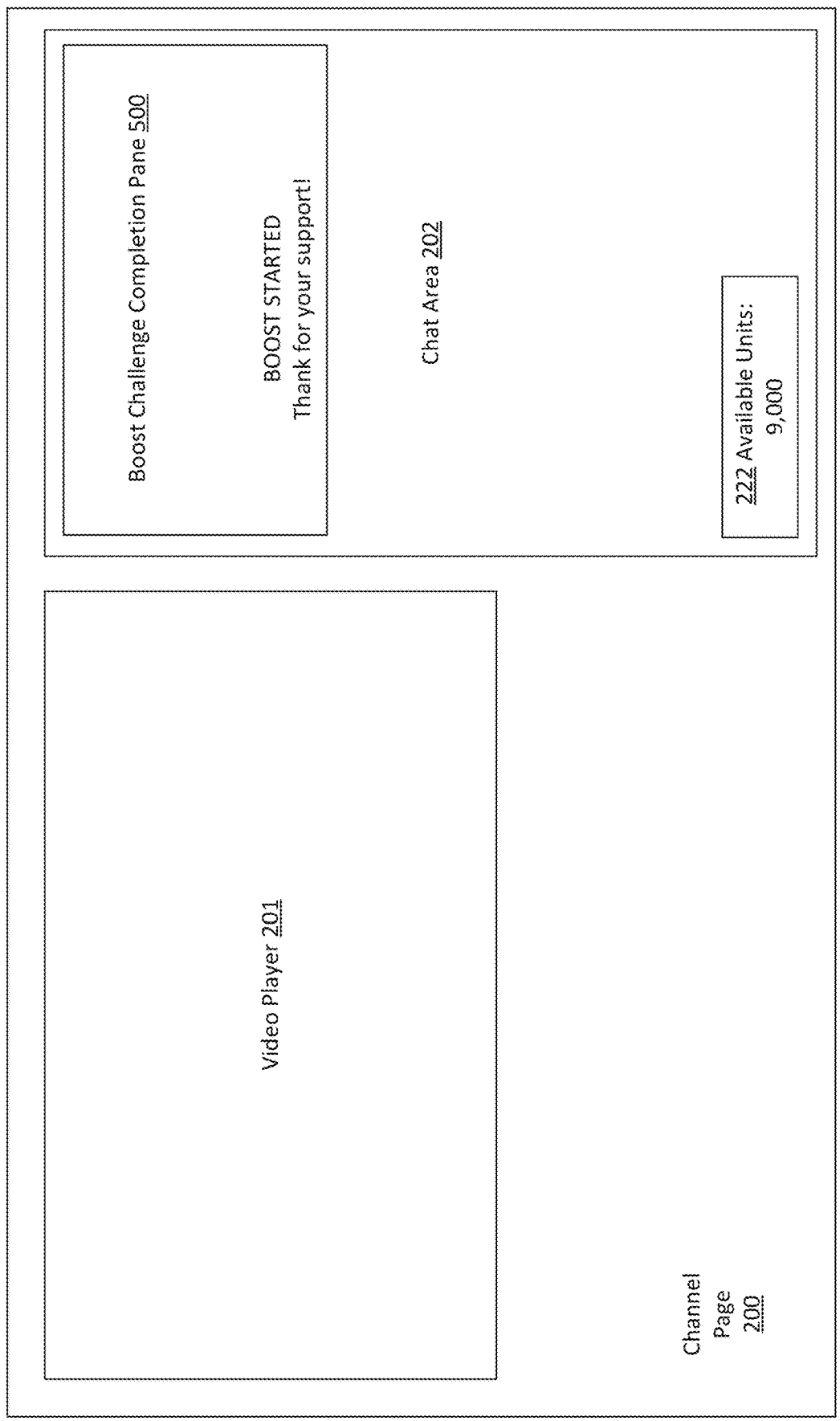
FIG. 5 is a diagram illustrating an example boost challenge completion pane that may be used in accordance with the present disclosure.

In the example of FIG. 4B, the viewer selects max contribute button 302 (as indicated by the thick bold line surrounding max contribute button 302) to contribute 750 achievement units to the boost challenge. This will cause the boost challenge to be successfully completed. Referring now to FIG. 5, an example of a boost challenge completion pane 500 is shown. The boost challenge completion pane 500 indicates that the boost challenge has started. Alternatively, if the creator has requested that the boost start time should be delayed, the boost challenge completion pane 500 may optionally indicate a future start time for the boost.

Figure 6:
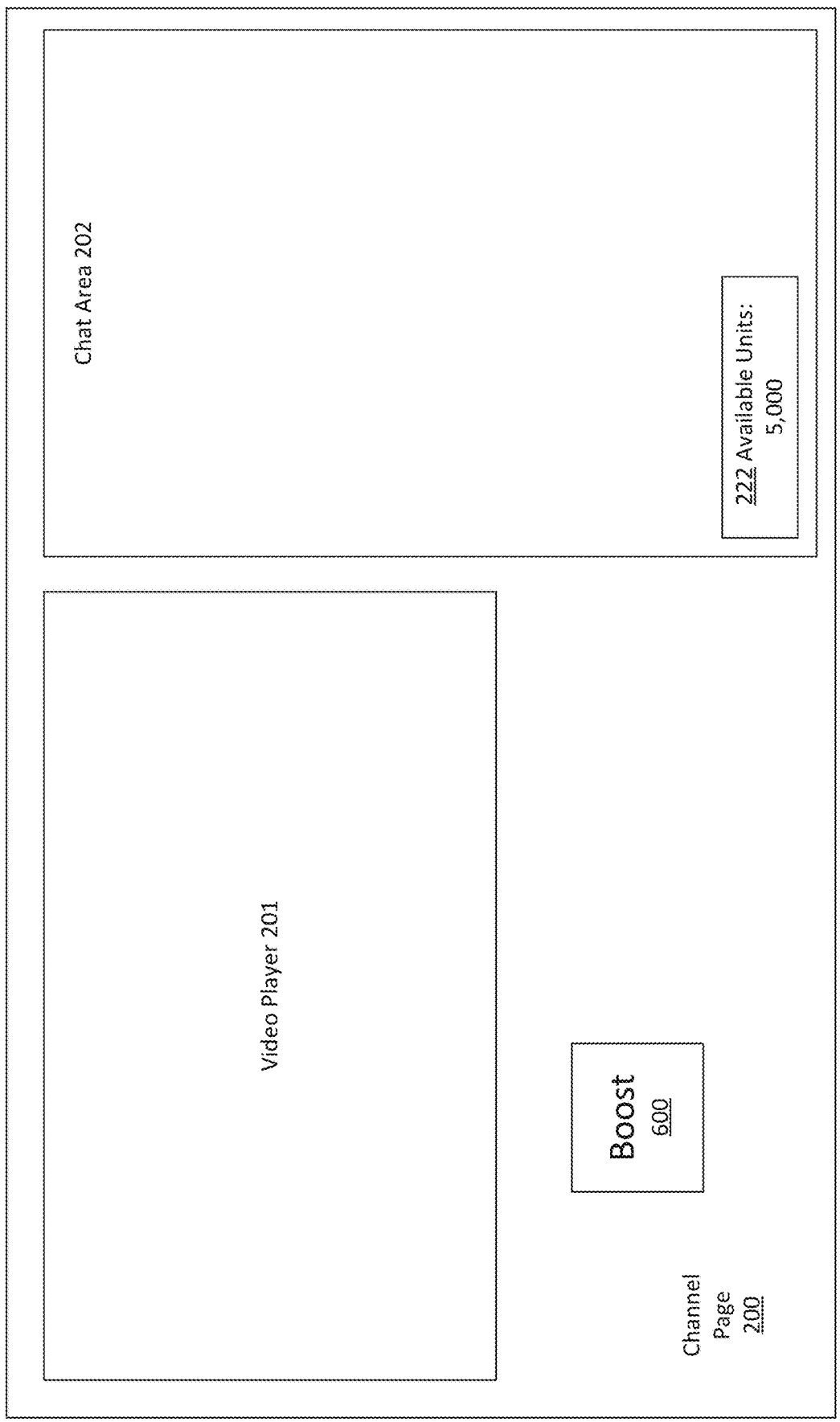
FIG. 6 is a diagram illustrating an example boost icon that may be used in accordance with the present disclosure.
Figure 7:
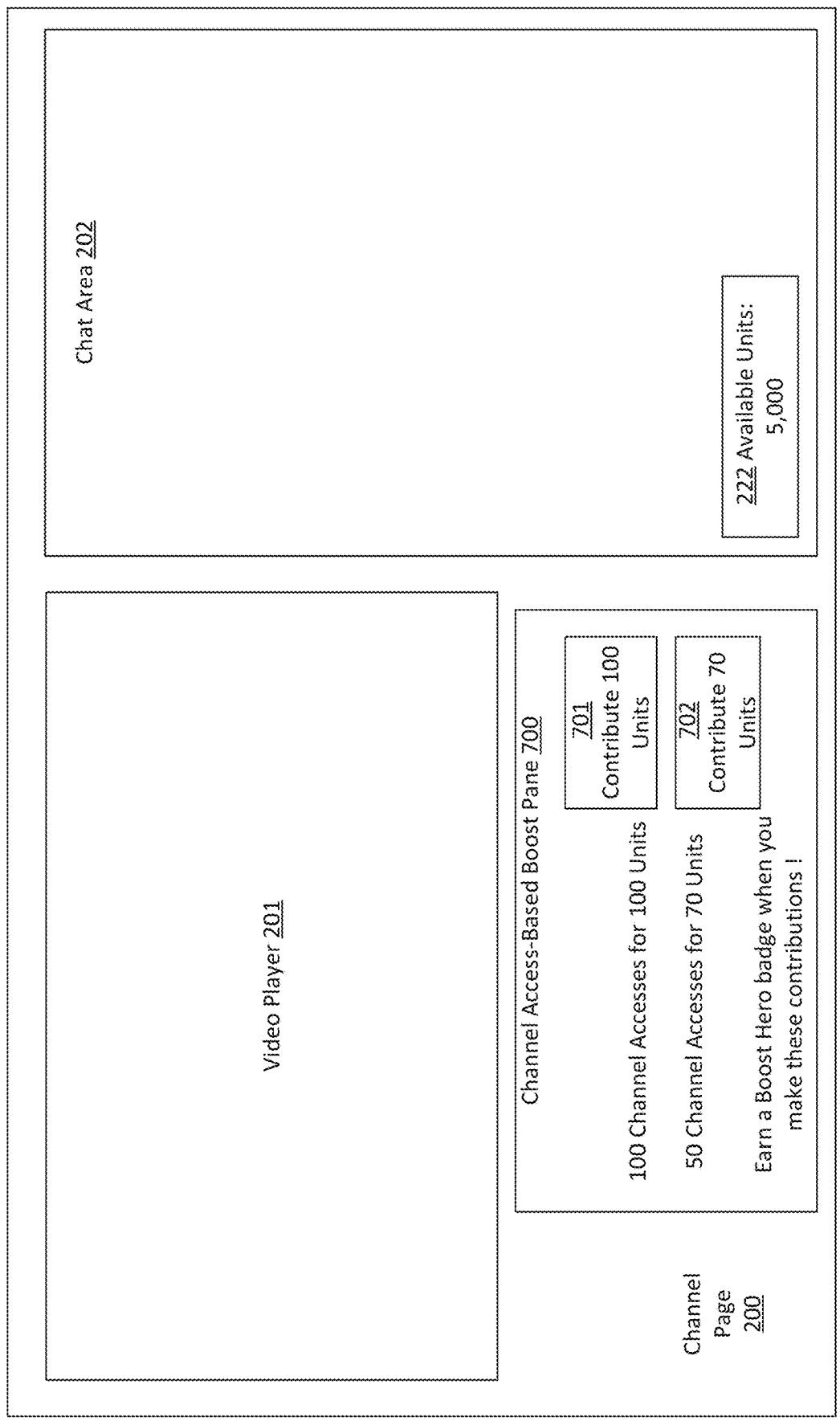
FIG. 7 is a diagram illustrating an example channel access-based boost pane that may be used in accordance with the present disclosure.

FIGS. 3-5 relate to examples in which the boost reward condition includes posting a link to the channel on the service homepage for a selected quantity of homepage loads, such as 10,000 homepage loads. It is noted however, that boosts may also have other boost reward conditions, such as posting a link to the channel on the service homepage for a selected quantity of channel accesses (e.g., clicks on the channel link by viewers). Referring now to FIGS. 6-7, some examples of interfaces for boosts with channel access-based reward conditions will now be described in detail. Specifically, referring now to FIG. 6, it is shown that a boost icon 600 is displayed on the channel page 200. In some examples, the boost icon 600 may be temporarily displayed on the channel page 200 to indicate to viewers when certain boosts are available, such as boosts with channel access-based reward conditions. In the example of FIG. 6, the boost icon 600 displays the word "Boost." It is noted, however, that other text or images may be displayed in the boost icon 600. In one specific example, an image of a rocket ship may be displayed to indicate when boosts are available. In some examples, selection of the boost icon 600 may cause additional information to be displayed about channel access based boosts.

Referring now to FIG. 7, an example of a channel access-based boost pane 700 will now be described in detail. In some examples, channel access-based boost pane 700 may be displayed in response to a viewer's selection of boost icon 600 of FIG. 6. As shown in FIG. 7, channel access-based boost pane 700 indicates that there are currently two channel access-based boosts available for the respective channel. The first boost provides a reward condition of 100 channel accesses. This means, for example, that a link to the channel may be posted on the service homepage until the channel has been accessed 100 times from the service homepage, such as by having viewers click on the posted link. The achievement condition for this boost is 100 achievement units, meaning that the viewer is required to provide 100 achievement units in order to cause the boost to occur. The channel access-based boost pane 700 includes a button 701, which the viewer may select in order to contribute 100 achievement units and cause the first boost to occur. Additionally, the second boost provides a reward condition of 50 channel accesses. This means, for example, that a link to the channel may be posted on the service homepage until the channel has been accessed 50 times from the service homepage, such as by having viewers click on the posted link. The achievement condition for this boost is 75 achievement units, meaning that the viewer is required to provide 75 achievement units in order to cause the boost to occur. The channel access-based boost pane 700 includes a button 702, which the viewer may select in order to contribute 75 achievement units and cause the second boost to occur.

The channel access-based boost pane 700 also includes an indication that making contributions of achievement units to achieve the listed boosts may earn a boost hero badge for the viewer that makes the contributions. In some examples, a boost hero badge is an icon (or other visual feature) that may be displayed within interfaces of the video streaming service 110 to indicate a viewer that has contributed to a boost. For example, in some cases, the boost hero badge may be placed next to the viewer's name in chat posts made by the viewer. In some examples, a boost hero badge may be provided for a duration of a stream that is transmitted by the respective channel. In addition or as alternative to hero badges, other rewards for boost contributors may also be provided, such as chat shoutouts, emotes, mentions within listings of boost contributors, and the like. In some examples, special rewards may be provided to viewers that provide the first boost for a channel and viewers that have reached certain quantity tiers for provided boosts. For example, a listing could be displayed of all viewers in different tiers of provided boosts.

Figure 8:
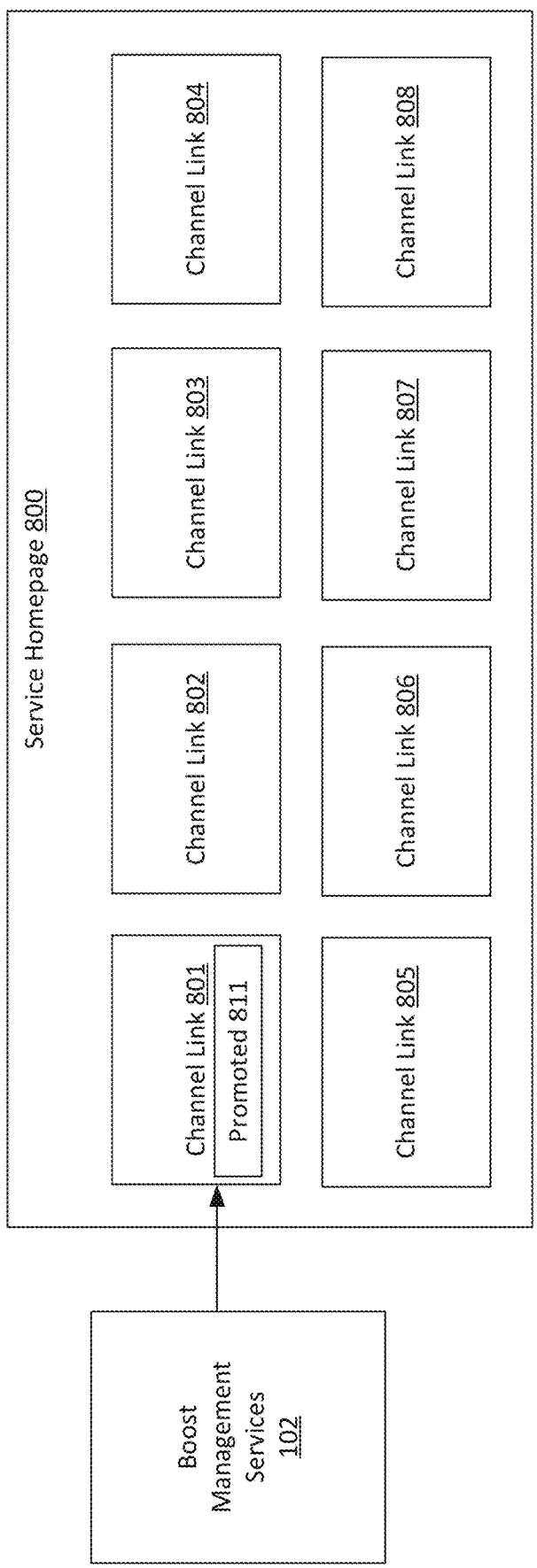
FIG. 8 is a diagram illustrating example promotion of a channel on a video streaming service homepage that may be used in accordance with the present disclosure.

Referring back to FIG. 1, it is seen that, once a boost has been achieved, the boost management service 102 may provide the boost promotion 123, such as by posting a link, such as in the form of a selectable thumbnail image, to the streaming channel on a high visibility interface of the video streaming service 110, such as a homepage of the video streaming service 110. Additionally or alternatively, in some examples, the visibility may be boosted by posting the link at a high visibility area of the homepage, such as a top-left area of the homepage that is often seen first by viewers of the homepage. Referring now to FIG. 8, an example of boost promotion 123 will now be described in detail. As shown in FIG. 8, service homepage 800 is a homepage of video streaming service 110. In this example, the service homepage 800 includes channel links 801-808, which each may link to a respective channel page of a respective streaming channel. Selection of one of channel links 801-808, such as by clicking on one of the channel links 801-808 with a mouse or touchscreen, may cause a viewer's browser to navigate from the service homepage 800 to the respective channel page. In some examples, channel links 801-808 may each include thumbnail images of their respective channel pages. In the example of FIG. 8, channel link 801 is for a currently promoted channel for which a boost is currently in-progress. The channel link 801 includes a promoted banner 811 to indicate that the respective channel is currently being promoted. As shown, the channel link 801 is posted at top-left area of the service homepage 800.

Referring back to FIG. 1, it is seen that boost progress feedback 124 may be provided from viewer interfaces, such as service homepage 800, to the boost management services 102. The boost progress feedback 124 may include indications of progress towards boost reward conditions, such as homepage loads and channel accesses. For example, in some cases, each time that service homepage 800, including channel link 801, is loaded in a viewer's browser, an indication of this page load may be provided to boost management services 102 as part of boost progress feedback 124. Additionally, each time that a viewer clicks on (or otherwise selects) channel link 801 on service homepage 800, an indication of this click (or other selection) may also be provided to boost management services 102 as part of boost progress feedback 124. Boost management services 102 may then use the boost progress feedback 124 to update and track quantities of page loads and/or channel accesses that are performed for channel link 801. The boost management services 102 may compare the tracked quantities of page loads and/or channel accesses to the respective reward quantities of page loads and/or channel accesses that are reward conditions for the boost. Once the tracked quantities of page loads and/or channel accesses have reached the reward quantities of page loads and/or channel accesses, then the boost may be terminated by the boost management services 102. For example, when its boost is terminated, channel link 801 may be removed from service homepage 800 (or may alternatively be moved from the top-left area of service homepage 800 to a lower-visibility area of service homepage 800).

It is noted that, any or all of the boost types described herein, such as page load-based boosts and channel access based-boosts, may be achieved based on contributions that are pooled together from multiple viewers or based on contributions from only a single viewer. Additionally, in some examples, boosts may be achieved in other ways. For example, in some cases, a boost may be obtained by having a viewer donate achievement units, such as points or money, to a creator, and then having the creator, in turn, provide and use those donated achievement units to obtain the boost. Also, in some examples, in addition or as an alternative to viewers, boosts may be partially or wholly achieved based on contributions from third parties, such as advertisers that purchase advertisements or other sponsored content. Moreover, in some examples, boosts may be obtained in combination with other items, such as channel subscriptions, advertisements and other sponsored content, increased pacing, time-based reservations, gifts to other viewers (e.g., as rewards for being new viewers to a channel), and the like.

In some examples, a boost reward condition may differ based at least in part on a type of achievement units that are received to satisfy the at least one boost achievement condition. For example, in some cases, a reward condition of a selected quantity of homepage loads could be used for boosts that are achieved based on contributions of a first type of achievement units, for example non-monetary units such as points and credits. As another example, a reward condition of a selected quantity of channel page accesses could be used for boosts that are achieved based on contributions of a second type of achievement units, for example monetary units. Also, in some examples, a boost reward condition may differ based at least in part on the selected quantity of the achievement units that are received to satisfy the at least one boost achievement condition. For example, in some cases, a reward of 50 channel accesses could be provided in exchange for 75 achievement units, while a reward of 100 channel accesses could be provided in exchange for 100 achievement units.

In some examples, indications of a progress of a boost may be displayed on a respective channel page that is being boosted. For example, indications may be provided when the boost reaches certain milestones, such as when selected percentages of the total boost reward have been satisfied. For example, for a boost that promotes a channel on a service homes page for a total of 1,000 homepage loads, indications may be provided, on the channel page, of when the channel has been promoted for 250 homepage loads (i.e., 25 percent of the total boost reward condition), promoted for 500 homepage loads (i.e., 50 percent of the total boost reward condition), and promoted for 750 homepage loads (i.e., 75 percent of the total boost reward condition). This may assist viewers in tracking the progress of the boost. In yet other examples, indications may be provided when new viewers access a channel page that is being promoted as part of the boost. For example, an indication of the new viewer could be displayed on the channel page, with a message that encourages other existing viewers to welcome the new viewer to their channel community.

FIG. 9 is a flowchart illustrating an example stream visibility boosting process that may be used in accordance with the present disclosure. The process of FIG. 9 is initiated at operation 910, at which it is determined that at least one first boost achievement condition is satisfied for temporarily boosting a first visibility of a first video streaming channel within one or more interfaces of a video streaming service. For example, in some cases, the first video streaming channel could be a low viewership channel, such as a channel in a low viewership tier of channels that have less than a threshold viewership quantity. As shown in FIG. 2, boost challenge characteristics 251 show an example in which, for the channels in the low viewership tier, the achievement condition is 100 achievement units, meaning that a boost challenge may be successfully completed (and a boost may be achieved) when 100 achievement units are contributed. Thus, the at least one first boost achievement condition may be based at least in part on a first viewership of the first video streaming channel. The at least one first boost achievement condition may additionally or alternatively be based at least in part on one or more other channel characteristics of the first video streaming channel. Additionally, the at least one first boost achievement condition may be satisfied based on one or more actions performed by one or more viewers of the first video streaming channel. Furthermore, the at least one first boost achievement condition may include receiving a selected quantity of achievement units. In some examples, in order to satisfy the at least one first boost achievement condition, the selected quantity of achievement units may be required to be received within a designated time duration corresponding to a boost challenge. As described above, boost management services may receive achievement feedback from interfaces such as channel pages, for example regarding contributions of achievement units, and the boost management services may monitor and track this achievement feedback to determine when the at least one first boost achievement conditions is satisfied.

At operation 912, the boosting of the first visibility of the first video streaming channel is initiated based on satisfaction of the at least one first boost achievement condition. In some examples, the boosting of the first visibility of the first video streaming channel may include posting a link to the first video streaming channel on a high visibility interface of the video streaming service, such as a homepage of the video streaming service. Additionally or alternatively, in some examples, the visibility may be boosted by posting the link at a high visibility area of the homepage, such as a top-left area of the homepage that is often seen first by viewers of the homepage.

At operation 914, it is determined that at least one first boost reward condition is satisfied. In some examples, the at least one first boost reward condition may include posting a link to the first video streaming channel on a homepage of the video streaming service for a selected quantity of loads of the homepage. As shown in FIG. 2, boost challenge characteristics 251 shown an example in which, for the channels in the low viewership tier, the reward condition for the low viewership tier is 1,000 homepage loads, meaning that a link to the channel may be posted on the service homepage until the homepage, including the posted link, is loaded 1,000 times. Also, in some examples, the at least one first boost reward condition may include accessing of the first video streaming channel for a selected quantity of times via a link to the first video streaming channel on a homepage of the video streaming service. The at least one first boost reward condition may be based at least in part on the first viewership. The at least one first boost reward condition may additionally or alternatively be based at least in part on one or more other channel characteristics of the first video streaming channel. As described above, boost management services may receive boost progress feedback from interfaces such as the service homepage, for example regarding quantities of homepage loads and/or channel accesses, and the boost management services may monitor and track this boost progress feedback to determine when the at least one first boost reward conditions is satisfied.

At operation 916, the boosting of the first visibility of the first video streaming channel is terminated based on satisfaction of the at least one first boost reward condition. For example, when the at least one first boost reward condition is satisfied, a link to a channel page of the first video streaming channel may be removed from the service homepage or moved from a higher visibility area (e.g., the top left area) of the service homepage to a lower visibility area of the service homepage.

At operation 918, it is determined that at least one second boost achievement condition is satisfied for temporarily boosting a second visibility of a second video streaming channel within one or more interfaces of a video streaming service, wherein the at least one second boost achievement condition is different than the at least one first boost achievement condition. For example, in some cases, the second video streaming channel could be a high viewership channel, such as a channel in a high viewership tier of channels that have greater than a threshold viewership quantity. As shown in FIG. 2, boost challenge characteristics 253 show an example in which, for the channels in the high viewership tier, the achievement condition is 1,000 achievement units, meaning that a boost challenge may be successfully completed (and a boost may be achieved) when 1,000 achievement units are contributed. Thus, the at least one second boost achievement condition may be based at least in part on a second viewership of the second video streaming channel, with the second viewership being different than the first viewership. It is noted that the at least one second boost achievement condition may additionally or alternatively be based at least in part on one or more other channel characteristics of the second video streaming channel that may differ from respective channel characteristics of the first channel upon which the first boost achievement condition may be based. Accordingly, at least one boost achievement condition may differ for different video streaming channels and may be determined based at least in part on viewership (and/or other channel characteristics) of the different video streaming channels. Additionally, at least one second boost achievement condition may be satisfied based on one or more actions performed by one or more viewers of the second video streaming channel. Furthermore, the at least one second boost achievement condition may include receiving a selected quantity of achievement units. In some examples, in order to satisfy the at least one second boost achievement condition, the selected quantity of achievement units may be required to be received within a designated time duration corresponding to a boost challenge.

At operation 920, the boosting of the second visibility of the second video streaming channel is initiated based on satisfaction of the at least one second boost achievement condition. In some examples, the boosting of the second visibility of the second video streaming channel may include posting a link to the video streaming channel on a high visibility interface of the video streaming service, such as a homepage of the video streaming service. Additionally or alternatively, in some examples, the visibility may be boosted by posting the link at a high visibility area of the homepage, such as a top-left area of the homepage that is often seen second by viewers of the homepage.

At operation 922, it is determined that at least one second boost reward condition is satisfied, wherein the at least one second boost reward condition is different than the at least one first boost reward condition. In some examples, the at least one second boost reward condition may include posting a link to the second video streaming channel on a homepage of the video streaming service for a selected quantity of loads of the homepage. As shown in FIG. 2, boost challenge characteristics 251 show an example in which, for the channels in the high viewership tier, the reward condition for the high viewership tier is 10,000 homepage loads, meaning that a link to the channel may be posted on the service homepage until the homepage, including the posted link, is loaded 10,000 times. Also, in some examples, the at least one second boost reward condition may include accessing of the second video streaming channel for a selected quantity of times via a link to the second video streaming channel on a homepage of the video streaming service. The at least one second boost reward condition may be based at least in part on the second viewership, with the second viewership being different than the first viewership. It is noted that the at least one second boost reward condition may additionally or alternatively be based at least in part on one or more other channel characteristics of the second video streaming channel that may differ from respective channel characteristics of the first channel upon which the first boost reward condition may be based. Accordingly, at least one boost reward condition may differ for different video streaming channels and may be determined based at least in part on viewership (and/or other channel characteristics) of the different video streaming channels.

At operation 924, the boosting of the second visibility of the second video streaming channel is terminated based on satisfaction of the at least one second boost reward condition. For example, when the at least one second boost reward condition is satisfied, a link to a channel page of the second video streaming channel may be removed from the service homepage or moved from a higher visibility area (e.g., the top left area) of the service homepage to a lower visibility area of the service homepage.

Figure 10:
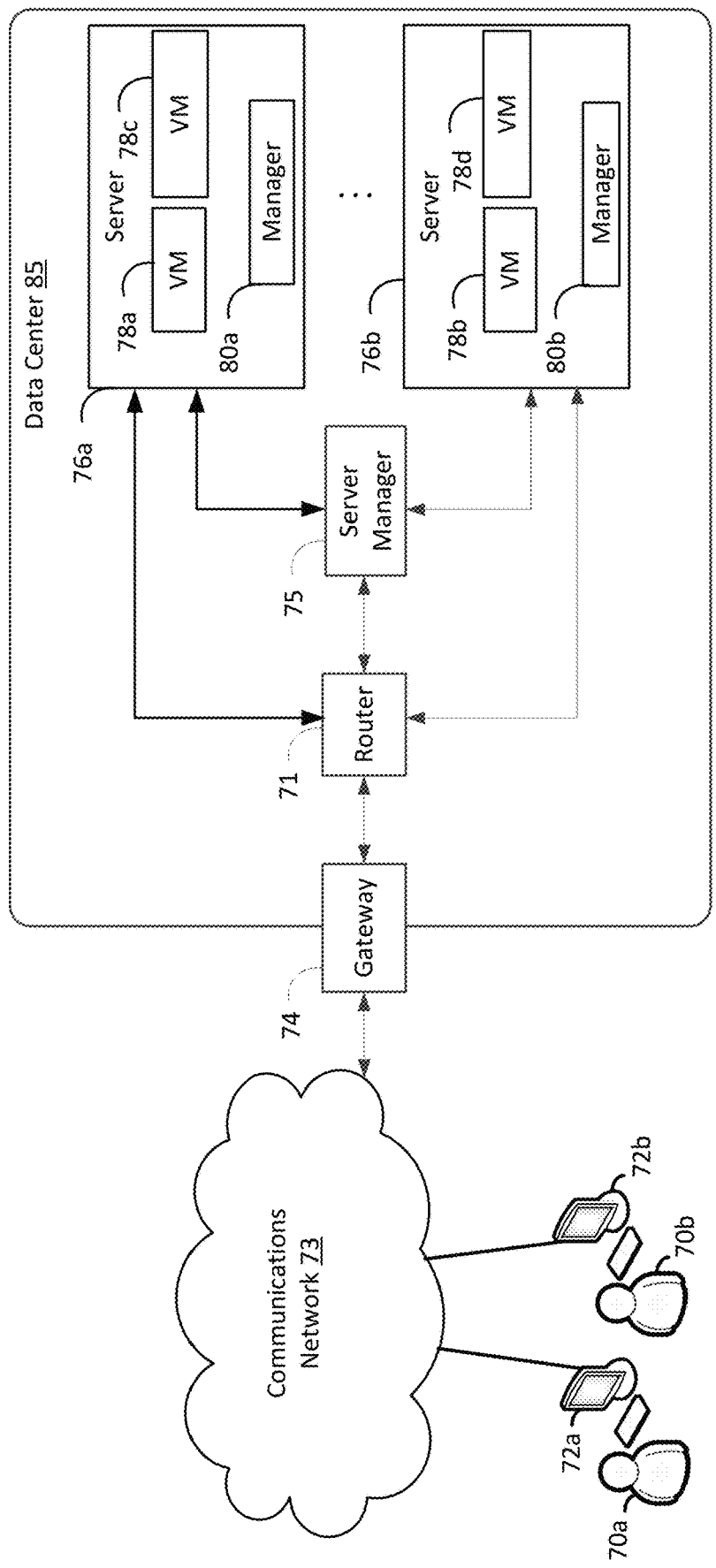
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76*a* and 76*b*. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
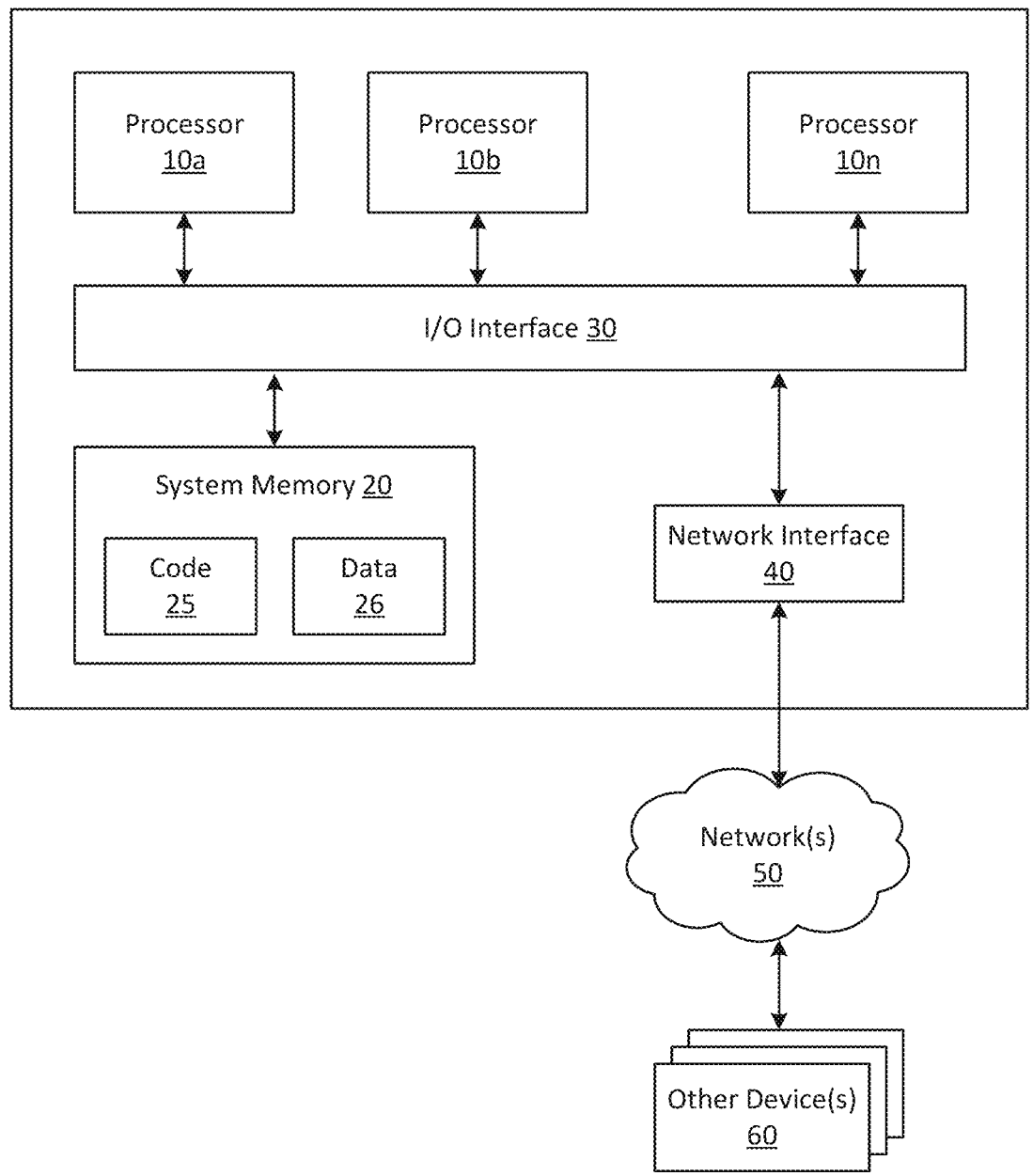
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
determining that at least one first boost achievement condition including receiving a first selected quantity of achievement units is satisfied for temporarily boosting a first visibility of a first video streaming channel within one or more interfaces of a video streaming service, wherein the first selected quantity of achievement units is based at least in part on a first viewership of the first video streaming channel;
initiating, based on satisfaction of the at least one first boost achievement condition, the boosting of the first visibility of the first video streaming channel;
determining that at least one first boost reward condition is satisfied, wherein the at least one first boost reward condition is based at least in part on the first viewership;
terminating, based on satisfaction of the at least one first boost reward condition, the boosting of the first visibility of the first video streaming channel;
determining that at least one second boost achievement condition including receiving a second selected quantity of achievement units is satisfied for temporarily boosting a second visibility of a second video streaming channel within the one or more interfaces of the video streaming service, wherein the second selected quantity of achievement units is based at least in part on a second viewership of the second video streaming channel, wherein the second selected quantity of achievement units is different than the first selected quantity of achievement units, and wherein the second viewership is different than the first viewership;
initiating, based on satisfaction of the at least one second boost achievement condition, the boosting of the second visibility of the second video streaming channel;
determining that at least one second boost reward condition is satisfied, wherein the at least one second boost reward condition is based at least in part on the second viewership, and wherein the at least one second boost reward condition is different than the at least one first boost reward condition; and
terminating, based on satisfaction of the at least one second boost reward condition, the boosting of the second visibility of the second video streaming channel.

2. The computing system of claim 1, wherein, in order to satisfy the at least one first boost achievement condition, the first selected quantity of achievement units are required to be received within a designated time duration corresponding to a boost challenge.

3. The computing system of claim 1, wherein the at least one first boost reward condition comprises posting a link to the first video streaming channel on a homepage of the video streaming service for a selected quantity of loads of the homepage.

4. The computing system of claim 1, wherein the at least one first boost reward condition comprises accessing of the first video streaming channel for a selected quantity of times via a link to the first video streaming channel on a homepage of the video streaming service.

5. A computer-implemented method comprising:
determining that at least one boost achievement condition including receiving a first selected quantity of achievement units is satisfied for temporarily boosting visibility of a first video streaming channel within one or more interfaces of a video streaming service, wherein the at least one boost achievement condition is satisfied based on one or more actions performed by one or more viewers of the first video streaming channel, wherein a plurality of different selected quantities of achievement units that are required to achieve boosts for a plurality of different video streaming channels vary based on quantities of viewers of the plurality of different video streaming channels, wherein the plurality of different selected quantities of achievement units include the first selected quantity of achievement units, and wherein the plurality of different video streaming channels include the first video streaming channel;
initiating, based on satisfaction of the at least one boost achievement condition, the boosting of the visibility of the first video streaming channel;
determining that at least one boost reward condition is satisfied; and
terminating, based on satisfaction of the at least one boost reward condition, the boosting of the visibility of the first video streaming channel.

6. The computer-implemented method of claim 5, wherein, in order to satisfy the at least one boost achievement condition, the first selected quantity of achievement units are required to be received within a designated time duration corresponding to a boost challenge.

7. The computer-implemented method of claim 5, wherein the at least one boost reward condition differs based at least in part on a type of the achievement units that are received to satisfy the at least one boost achievement condition.

8. The computer-implemented method of claim 5, wherein the at least one boost reward condition differs based at least in part on the first selected quantity of the achievement units that are received to satisfy the at least one boost achievement condition.

9. The computer-implemented method of claim 5, wherein the boosting of the visibility of the first video streaming channel comprises posting a link to the first video streaming channel on a homepage of the video streaming service.

10. The computer-implemented method of claim 9, wherein the at least one boost reward condition comprises posting the link to the first video streaming channel on the homepage of the video streaming service for a selected quantity of loads of the homepage.

11. The computer-implemented method of claim 9, wherein the at least one boost reward condition comprises accessing of the first video streaming channel for a selected quantity of times via the link to the first video streaming channel on the homepage.

12. One or more non-transitory computer-readable storage media having stored thereon computing instructions that, upon execution by one or more computing devices, cause the one or more computing devices to perform operations comprising:

determining that at least one boost achievement condition including receiving a first selected quantity of achievement units is satisfied for temporarily boosting visibility of a first video streaming channel within one or more interfaces of a video streaming service, wherein the at least one boost achievement condition is satisfied based on one or more actions performed by one or more viewers of the first video streaming channel, wherein a plurality of different selected quantities of achievement units that are required to achieve boosts for a plurality of different video streaming channels vary based on quantities of viewers of the plurality of different video streaming channels, wherein the plurality of different selected quantities of achievement units include the first selected quantity of achievement units, and wherein the plurality of different video streaming channels include the first video streaming channel;

initiating, based on satisfaction of the at least one boost achievement condition, the boosting of the visibility of the first video streaming channel;

determining that at least one boost reward condition is satisfied; and terminating, based on satisfaction of the at least one boost reward condition, the boosting of the visibility of the first video streaming channel.

13. The one or more non-transitory computer-readable storage media of claim 12, wherein, in order to satisfy the at least one boost achievement condition, the first selected quantity of achievement units are required to be received within a designated time duration corresponding to a boost challenge.

14. The one or more non-transitory computer-readable storage media of claim 12, wherein the at least one boost reward condition differs for the plurality of different video streaming channels and is determined based at least in part on the quantities of viewers of the plurality of different video streaming channels.

15. The one or more non-transitory computer-readable storage media of claim 14, wherein the at least one boost reward condition comprises posting a link to the first video streaming channel on a homepage of the video streaming service for a selected quantity of loads of the homepage.

16. The one or more non-transitory computer-readable storage media of claim 14, the at least one boost reward condition comprises accessing of the first video streaming channel for a selected quantity of times via a link to the first video streaming channel on a homepage of the video streaming service.

* * * * *